US006035148A

United States Patent [19]

Jehan

[11] Patent Number: 6,035,148

[45] Date of Patent: Mar. 7, 2000

[54] SHUTTERING SYSTEM FOR A SENSITOMETER

[75] Inventor: Howard P. Jehan, Honeoye Falls, N.Y.

[73] Assignee: Eastman Kodak Company, Rochester, N.Y.

[21] Appl. No.: 09/222,648

[22] Filed: Dec. 30, 1998

[51] Int. Cl.[7] .......................... G03B 41/00; G01N 21/00

[52] U.S. Cl. .......................................... 396/563; 356/443

[58] Field of Search .......................... 396/563; 356/443, 356/444, 404; 430/30; 355/38, 35, 36, 53

[56] References Cited

U.S. PATENT DOCUMENTS

| | | | |
|---|---|---|---|
| 849,277 | 4/1907 | Sohon | 396/563 |
| 1,245,606 | 11/1917 | MacCurdy et al. | 396/563 |
| 1,382,272 | 6/1921 | Davis | 396/563 |
| 1,883,884 | 10/1932 | Doran | 396/563 |
| 2,521,954 | 9/1950 | Tuttle et al. | 355/36 |
| 2,763,192 | 9/1956 | Tyler et al. | 396/563 |
| 2,947,232 | 8/1960 | Armentrout et al. | 355/83 |
| 3,984,185 | 10/1976 | Vinatzer | 355/38 |
| 4,082,465 | 4/1978 | Bickl et al. | 356/444 |
| 4,131,349 | 12/1978 | Tobias | 396/563 |
| 5,393,624 | 2/1995 | Ushijima | 430/30 |
| 5,400,116 | 3/1995 | Jehan et al. | 355/53 |

OTHER PUBLICATIONS

Journal of SMPTE, vol. 66, Sep. 1957, A 16mm Process Controll Sensitometer by Geo W. Colburn, pp. 552–554.

*Primary Examiner*—W. B. Perkey

*Attorney, Agent, or Firm*—Mark G. Bocchetti

[57] ABSTRACT

A shuttering system for a sensitometer is taught which can be used both conventional and high speed exposures. The shuttering system includes a high speed rotating sector shutter, a rotating capping sector shutter, a mask and a sample transport all of which are precisely controlled relative to one another. Located closest to the sample of radiation sensitive material is the mask having three different width slits therein. The different width slits produce different and predictable exposure times when the sample is moved past at a constant velocity. Positioned behind the mask is the high speed sector shutter which is a thin disk having two different size exposing apertures therein located 180° apart to thereby produce different exposure times depending on the rotational speed of the disk. The rotating capping shutter is positioned behind the high speed shutter and has one aperture therein. The first way uses the sample transport system to move the sample past one of the slits in the mask at a constant velocity. For short exposure times of 4 msec to 100 μsec, the high speed sector shutter and the capping sector shutter are spinning synchronized to each other and synchronized to the position of the sample transport. The rotation of the capping shutter is synchronized with the high speed shutter so that the exposing apertures of each shutter are aligned during an exposure. The spinning of these two shutters is also synchronized with the sample transport so that light passes onto the sample precisely when each test object step is centered on the exposure plane.

13 Claims, 7 Drawing Sheets

SHUTTERING SYSTEM FOR A SENSITOMETER

FIELD OF THE INVENTION

The present invention relates generally to instruments for measuring the sensitivity of light-sensitive materials and, more particularly, to a high speed shuttering system for sensitometers.

BACKGROUND OF THE INVENTION

A variety of sensitometer devices are known in the prior art to expose samples of photographic papers and films in a very precise manner for subsequent densitometric analysis in which the density of the image produced by such exposure is measured. Such devices and the methods practiced thereby must be capable of exposing photosensitive samples with a high degree of precision, accuracy and repeatability.

In known sensitometers, the radiant energy source typically is located far enough away from the sample that the sample is essential uniformly illuminated and still receives enough radiant energy for proper exposure. Exposure times are created by a variety of shutter mechanisms, located either very close to the light source or very close to the sample.

U.S. Pat. No. 5,400,116 to Jehan et al teaches a sensitometer which includes a blade-type shutter in combination with a rotating shutter member having an aperture therein. The exposure plane is formed at one surface of an aperture plate which is moveable parallel to the sample and which contains an aperture through which light travels to expose the photographic sample. The size of this aperture determines the area of the sample to receive the exposure. The sample is loaded into a support means which moves the sample in the exposure plane. Gradated exposures are achieved by spinning the rotating shutter member at the speed necessary to produce the required exposure times. The slower operating blade-type shutter is used to prevent multiple exposures from occurring. If the required exposure time is sufficiently long for the blade-type shutter to operate, the blade-type shutter may be used to produce the exposure times with the rotating shutter member fixed so as to pass radiant energy therethrough.

U.S. Pat. No. 1,382,272 to Davis teaches a sensitometer which has an oscillating cap shutter and rotating sector shutter. The cap shutter can be set to remain open for an integer number of revolutions of the sector shutter. The sector shutter includes a pair of openings therein, one of which is graduated.

U.S. Pat. No. 1,883,884 to Durand teaches a photographic sensitometer which includes a rotating shutter member having an aperture therethrough a second plate mounted to the same shaft as the shutter member may be rotated relative to the shutter member to thereby vary the aperture supplied by the arcuate opening in the shutter member.

U.S. Pat. No. 2,763,192 to Tyler et al teaches a photographic sensitometer with a rotating shutter system. The shutter system includes a disk having a scanning slit therein. The length of the scanning slit can be adjusted to give different times of exposure by means of a second disk which is rotatably mounted to the face of the first disk. The speed of rotation of the first disk and the length of the scanning slit determine the time of exposure for each step of the film strip. Located behind the first disk is a pivoting shutter which is swung to a closed position in order to cover the window to the lamp house when the drive motor is not in operation. This pivoting shutter is operated by a rotary solenoid.

The prior art fails to teach a photographic sensitometer which uses both a rotating high speed sector shutter and a rotating capping shutter. Typically, prior art systems include a capping shutter or an electronic shutter to prevent the high speed sector shutter from making exposures every revolution (or every half revolution if the shutter has two apertures). These prior art capping shutters are essentially reciprocating blades. To make a complete cycle from closed to open to closed, the blades must be accelerated from rest (in the closed position) and decelerated to rest again (in the open position) and then accelerated and decelerated in the opposite direction back to the closed position again. An exemplary shutter of this type that has a sufficiently large aperture to allow light to pass is the Uniblitz™ VS25 as manufactured by Vincent Associates of Rochester, N.Y. The minimum time required to open and close the shutters is 10 msec. Further, there is an approximate 3 msec delay when power is supplied to the shutter to the time when the shutter actually starts moving. In addition, these times are valid only for an 80% opening and 20% closing. Longer times (unspecified by the manufacturer) are required in order to achieve a fully opened or fully closed position. Further, reciprocating blades do not allow for uniform exposure. That is, the center of the shutter is always open for a longer time than the edges of the shutter. In addition, reciprocating shutter systems tend to wear resulting in great differences in time to complete a cycle in what are otherwise identical reciprocating shutters.

SUMMARY OF THE INVENTION

It is therefore an object of the present invention to provide a shuttering system which allows for exposures with a substantially uniform exposure time.

It is a further object of the present invention to provide a shuttering system for a sensitometer which can make 0.0001 second exposures and yet allows for a completely open optical path 98 in order to calibrate the system.

Yet another object of the present invention is to provide a shuttering system wherein the capping shutter is more reliable than a reciprocating blade shutter.

Still another object of the present invention is to provide a shuttering system wherein the exposing apertures are relatively wide such that dimensional errors in such exposing apertures will have less of an effect on exposure uniformity.

A further object of the present invention a shuttering system which allows the user to predict when the exposures will actually occur (to within a few msec).

Briefly stated, the foregoing and numerous other features, objects and advantages of the present invention will become readily apparent upon a reading of the detailed description, claims and drawings set forth herein. These features, objects and advantages are accomplished by providing a high speed rotating sector shutter, a rotating capping sector shutter, a mask and a sample transport all of which are precisely controlled relative to one another. Located closest to the sample of radiation sensitive material is the mask having three different width slits therein. The different width slits produce different and predictable exposure times when the sample is moved past at a constant velocity. Positioned behind the mask is the high speed sector shutter which is a thin disk having two different size exposing apertures therein located 180° apart to thereby produce different exposure times depending on the rotational speed of the disk. The larger aperture should be large enough to allow each slit on the mask and a portion of the test object and sample behind it to be completely illuminated. The rotating capping shutter is positioned behind the high speed shutter and has one aperture therein. The capping shutter is used to prevent multiple exposures when using the high speed shutter and prevents light from reaching the sample when exposures are not being made. Both the high speed shutter and the capping shutter are powered by microstep-motors which are capable of accelerating the shutters at high speeds and can accurately position the shutter apertures when stopped. Servo-type motors may also be used to drive the high speed shutter and the capping shutter. Both the high speed shutter and the capping shutter have home sensors that are used to position the shutter apertures when the shutters are not spinning and provide synchronization timing signals when spinning. Positionable neutral density, illuminate, and auxiliary filters are located between the cap shutter and the high speed shutter. This allows the cap shutter to prevent light from fading these filters when exposures are not being made. A positionable heat absorber is located between the cap shutter and the lamp allowing the heat absorber to reduce the heat load on the cap shutter disk as well as providing additional exposure filtration.

The shuttering system of the present invention can be used to produce exposures in two different ways. The first way uses the sample transport system to move the sample past one of the slits in the mask at a constant velocity. The different slit sizes (for example 0.400 inches, 0.160 inches, and 0.80 inches) coupled with a nominal sample velocity of 4 inches per second or 8 inches per second produces exposure times of 0.100 seconds, 0.040 seconds, 0.020 seconds, and 0.10 seconds. Actual sample transport speeds will need to be calibrated for each exposure to take into account actual slit sizes and lamp position. It is also necessary to consider lamp position in order to account for parallax errors caused by the slit not being in intimate contact with the sample being exposed. When exposing with the slits in the mask, the high speed sector shutter and the capping sector shutter are rotated into a position to allow light to pass onto the test object for the whole exposure cycle and are moved to block the light after the exposure is complete. For short exposure times of 4 msec to 100 μsec, the high speed sector shutter and the capping sector shutter are spinning synchronized to each other and synchronized to the position of the sample transport. The rotation of the capping shutter is synchronized with the high speed shutter so that the exposing apertures of each shutter are aligned during an exposure. The spinning of these two shutters is also synchronized with the sample transport so that light passes onto the sample precisely when each test object step is centered on the exposure plane. The high speed shutter home sensor provides the synchronization signal. Movement of the sample transport and cap shutter are also referenced to home sensors. The acceptability of each exposure may be determined by timing the differences between the cap shutter home signal and the high speed shutter home signal and comparing this time differential with predetermined acceptable limits based upon the physical sizes of both shutters.

DETAILED DESCRIPTION OF THE INVENTION

Figure 1:
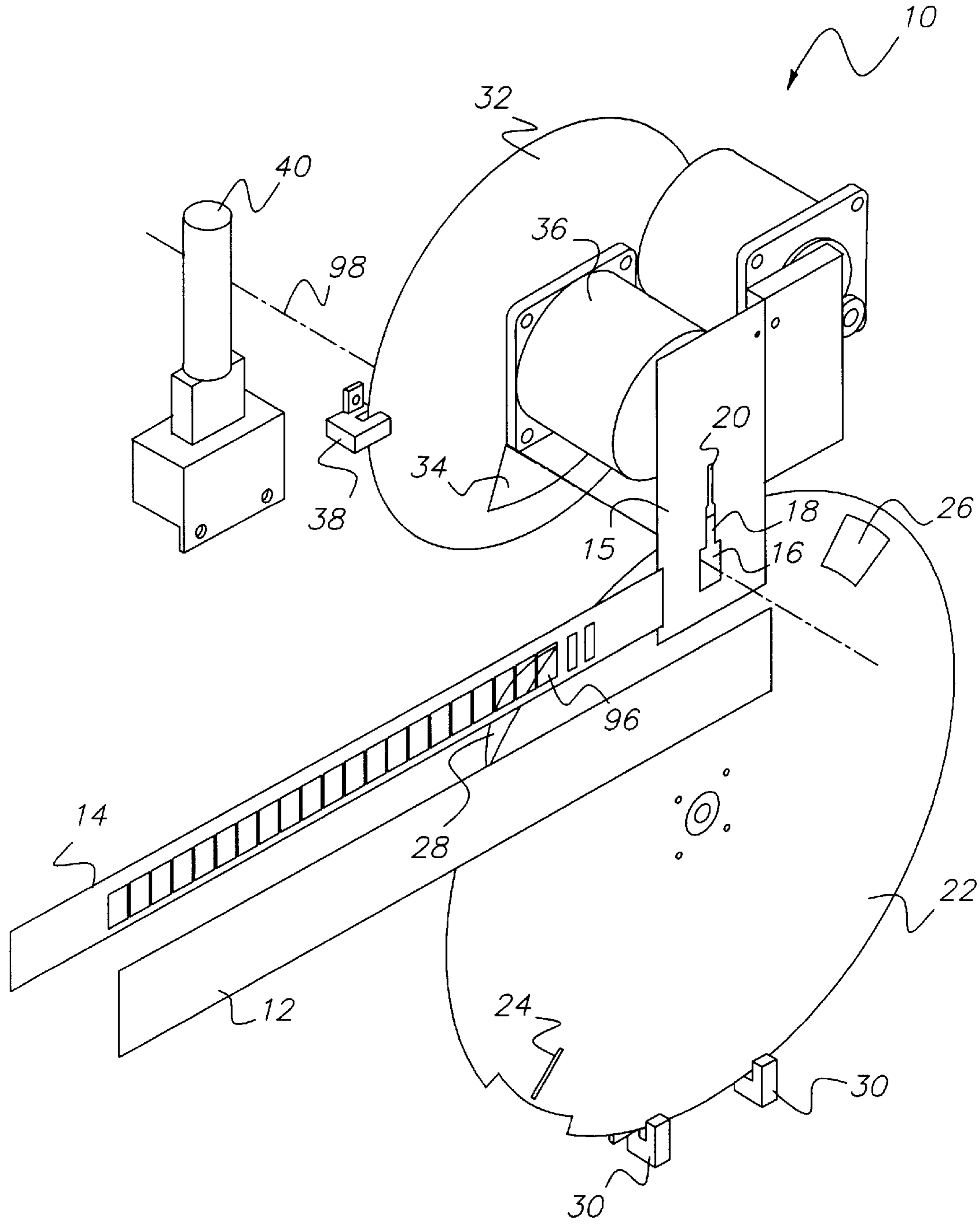
FIG. 1 is a perspective schematic of the components of the shuttering system of the present invention.
Figure 2:
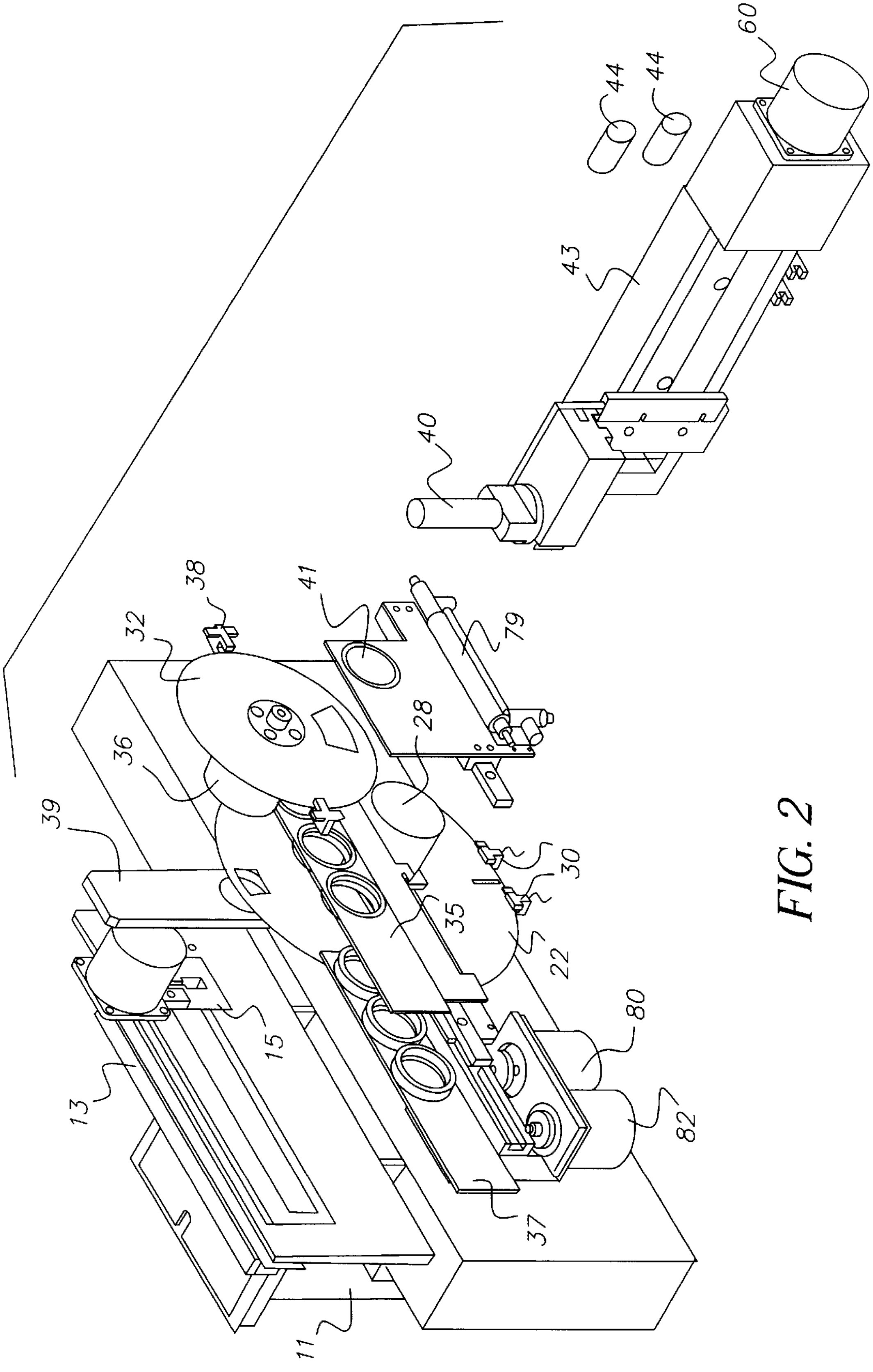
FIG. 2 is a first perspective view of a sensitometer including the shuttering system of the present invention.
Figure 3:
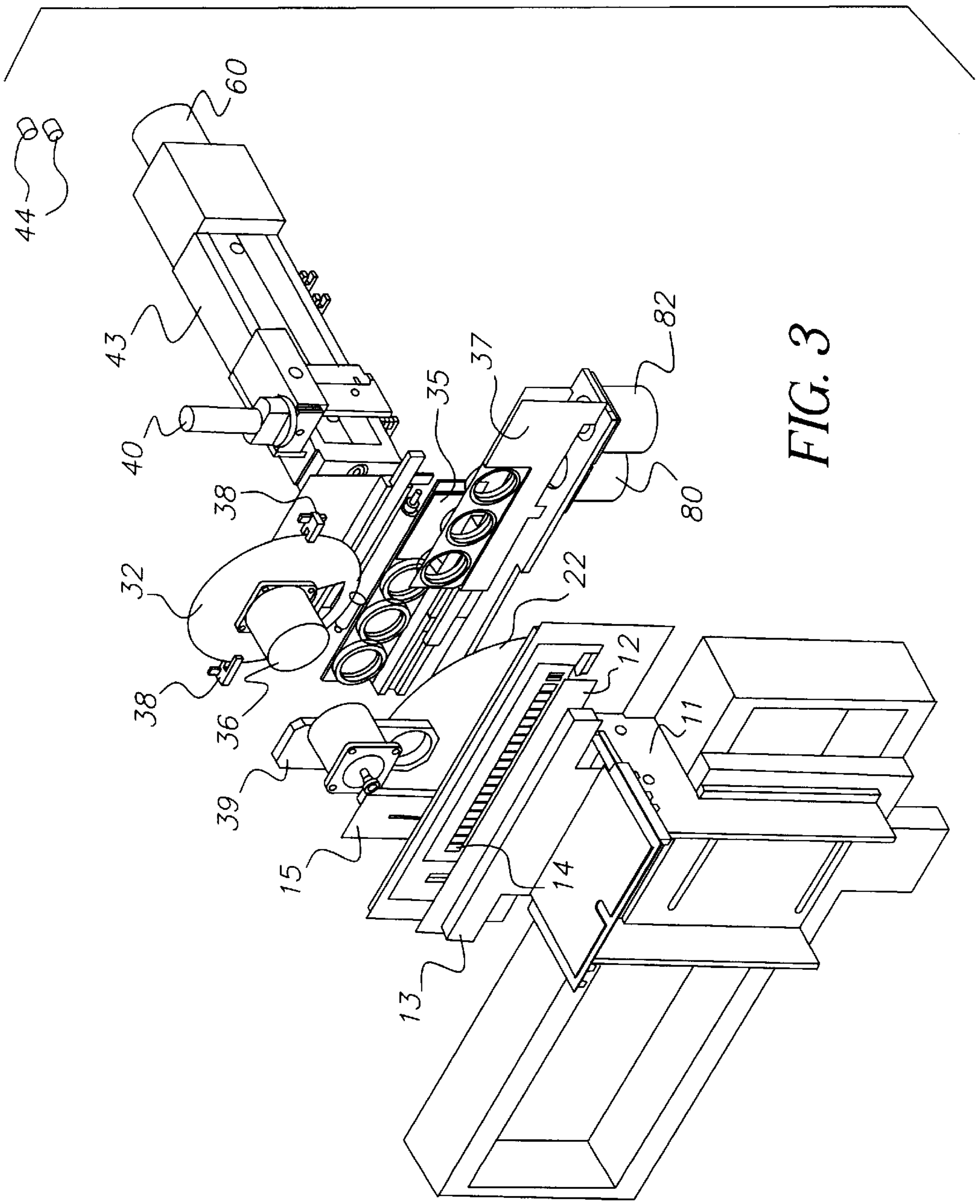
FIG. 3 is a second perspective view of the sensitometer shown in FIG. 2 including the shuttering system of the present invention.

Turning first to FIGS. 1, 2 and 3, there is shown the shutter system 10 of the present invention for a sensitometer. FIG. 1 is a perspective schematic of the basic hardware of the shutter system 10. FIG. 2 is a perspective view of the sensitometer with the shutter system. FIG. 3 is a reverse perspective view of the sensitometer with the shutter system. Sample transport hardware 11 supports the sample 12 and automated press-platen 13 is used to hold the sample 12 flat to the test object 14 during an exposure. The press-platen 13 which contacts the sample 12 is preferably formed from black, compressible, resilient material. When the operator initiates the test cycle, the sample accelerates up to speed gradually (e.g. 4 inches per second in ½ second or 8 inches per second in ¼ second) giving the operator time to release the sample 12 and press-platen 13 before the exposure is made.

The radiant energy reaching the sample is attenuated through the test object 14 located between the light source and the sample, with the sample 12 usually pressed flat against the test object 14. Such test objects 14 are made from a material transparent to the radiant energy to which have been added graded amounts of some spectrally neutral attenuating material, such as carbon or Inconel in the case of visible light, often in twenty-one individual steps measuring about 10 mm by 10 mm. Thus, radiant energy passing through the test object is attenuated by the added material before striking the sample. Often, the exposed and processed sample 12 has an exposed area measuring about 210 mm by 10 mm which is made up of twenty-one contiguous steps, each step in the test object being made to attenuate radiant energy differently than its neighbors. Such test objects typically attenuate visible light by 0.10 log, 0.15 log or 0.20 log increments to form what are called 0-2, 0-3 and 0-4 gradient test objects, respectively. There are opaque areas on either side of the exposure steps (usually there are 21 exposure steps) that allow the shutter system 10 to open and close without exposing the sample 12.

The sample 12 is driven past a mask 15 having three slits 16, 18, and 20 therein. Slits 16, 18, 20 decrease in size to produce different exposure times when samples are moved past. For example, slit 16 may have a width of 0.400 inches, slit 18 may have a width of 0.160 inches and slit 20 may have a width of 0.080 inches. Slits 16 and 18 can then be used to produce exposure times of 0.100 seconds and 0.040 seconds, respectively, when the sample 12 is moved past such slits 16, 18 at a speed of 4 inches per second. Slits 18 and 20 can be used to produce exposure times of 0.020 seconds and 0.010 seconds when the sample 12 is moved past at a velocity of 8 inches per second. The slits 16, 18, 20 should be positioned as close as possible to sample 12 in order to minimize exposure time errors caused by parallax.

Positioned closely behind mask 15 is a high speed sector shutter 22. High speed sector shutter 22 is a thin disk and, in this example, has a diameter of 9.25 inches. High speed sector shutter 22 includes a first aperture 24 and a second aperture 26 therein located 180° apart from one another. First aperture 24 is smaller than second aperture 26 such that each will produce a different exposure time. For example, first aperture 24 may be sized to have an arc length of 1.44° and as such would produce exposure times of 0.0004 seconds 0.0002 seconds and 0.0001 seconds when rotated at 10 rps, 20 rps, and 40 rps, respectively. Second aperture 26 may, for example, have an arc length of 14.4° and thus will produce exposure times of 0.004 seconds, 0.002 seconds, and 0.001 seconds when rotated at 10 rps, 20 rps, and 40 rps, respectively. The larger aperture, that being second aperture 26 should be large enough to allow each slit, 16, 18, 20 in mask 14 to be completely illuminated. High speed sector shutter 22 is powered by a micro-step motor 28 which is capable of accelerating high speed sector shutter 22 the required speed and can accurately position first and second apertures 24, 26, when stopped. Positioning is theoretically accurate to within 0.864 arc-minutes. Home sensors 30 (which are preferably optical transmission-type sensors) are used to position shutter apertures 24, 26 when sector shutter 22 is not rotating and also to provide synchronization and timing signals when sector shutter 22 is rotating.

A capping shutter 32 is positioned behind high speed shutter 22. Capping shutter 32 includes a single aperture 34 therein. By way of example, capping shutter 32 may have a diameter of about 6 inches and aperture 34 may have an arc length of 40°. Capping shutter 32 is used to prevent multiple exposures when high speed sector shutter 22 is being used and is also used to prevent light from reaching sample 12 when exposures are not being made. Rotation of capping shutter 32 is driven by a micro-step motor 36 which like micro-step motor 28 is capable of accelerating capping shutter 32 at a high speed and can accurately position aperture 34 when capping shutter 32 is stopped. Again, positioning is theoretically accurate to 0.864 arc-minutes. Home sensors 38 are used to position shutter aperture 34 to be 180° out of alignment from the optical path 98 when capping shutter 32 is not rotating and further provides synchronization timing signals when capping shutter 32 is rotating.

Neutral density filter 35, illuminate filter 37, and auxiliary filter 39 (not shown) are located between capping shutter 32 and high speed shutter 22. This allows capping shutter 32 to prevent light from lamp 40 from fading these filters when exposures are not being made. The heat absorber 41 is positioned between the capping shutter 32 and the lamp 40. Heat absorber 41 reduces the heat load on capping shutter 32. Lamp 40 is supported by lamp positioning mechanism 43 which is used to control the position of lamp 40 along optical path 98 such that lamp 40 can be moved closer to or further away from sample 12 and test object 14. There are lamp intensity sensors 44 supported within the housing (not shown) of the sensitometer.

The shutter system 10 of the present invention may be used in two ways to produce exposures. The first exposure method is designed to produce exposure times from 0.100 seconds to 0.010 seconds. In this mode of operation, the sample transport causes the sample 12 to move past one of the slits 16, 18, 20 at some constant velocity. Slit sizes of 0.400 inches, 0.160 inches, and 0.800 inches coupled with a nominal sample transport velocity of 4 inches per second or 8 inches per second produces exposure times of 0.100 seconds, 0.040 seconds, 0.020 seconds and 0.010 seconds. Actual sample transport speeds should be calibrated for each exposure to take into account the actual sizes of slits 16, 18, and 20 and the position of lamp 40 in order to account for parallax errors. When exposing with the slits, the high speed shutter 22 and the capping shutter 32 are rotated into position to allow light to pass onto the test object for the whole exposure cycle and are moved to block all the light from lamp 40 after the exposure is complete.

For shorter exposure times of from 4 msec to 100 μsec, the high speed shutter 22 and the capping shutter 32 are both rotating in synchronized to one another and to the position of the sample transport 11. The rotation of capping shutter 32 is synchronized with the high speed shutter 22 so that a selected one of the exposing apertures 24, 26 of high speed shutter 22 and aperture 34 of capping shutter 32 are aligned during an exposure. The rotation of the high speed shutter 22 and the capping shutter 32 are also synchronized with the sample transport so that light from lamp 40 passes onto the sample 12 precisely when each test object step is centered on the exposure plane. The high speed shutter home sensors 30 provide the synchronization signal. The time difference between the high speed shutter home sensors 30 and the cap shutter home sensors 38 is measured for each exposure cycle to make sure the exposure is correctly made.

Slit exposures are made by sweeping the sample 12 past one of three slits 16, 18, 20. Exposure times to be produced with the slit are: 0.100, 0.040, 0.020, and 0.010 sec. Due to the thickness of the test object and of other hardware, these slits 16, 18, 20 can not be located directly at the film plane. Therefore parallax will cause these slits 16, 18, 20 to image slightly larger onto the sample 12. This effect will need to be taken into consideration when calculating how fast to move the sample to get the desired exposure times.

Figure 4:
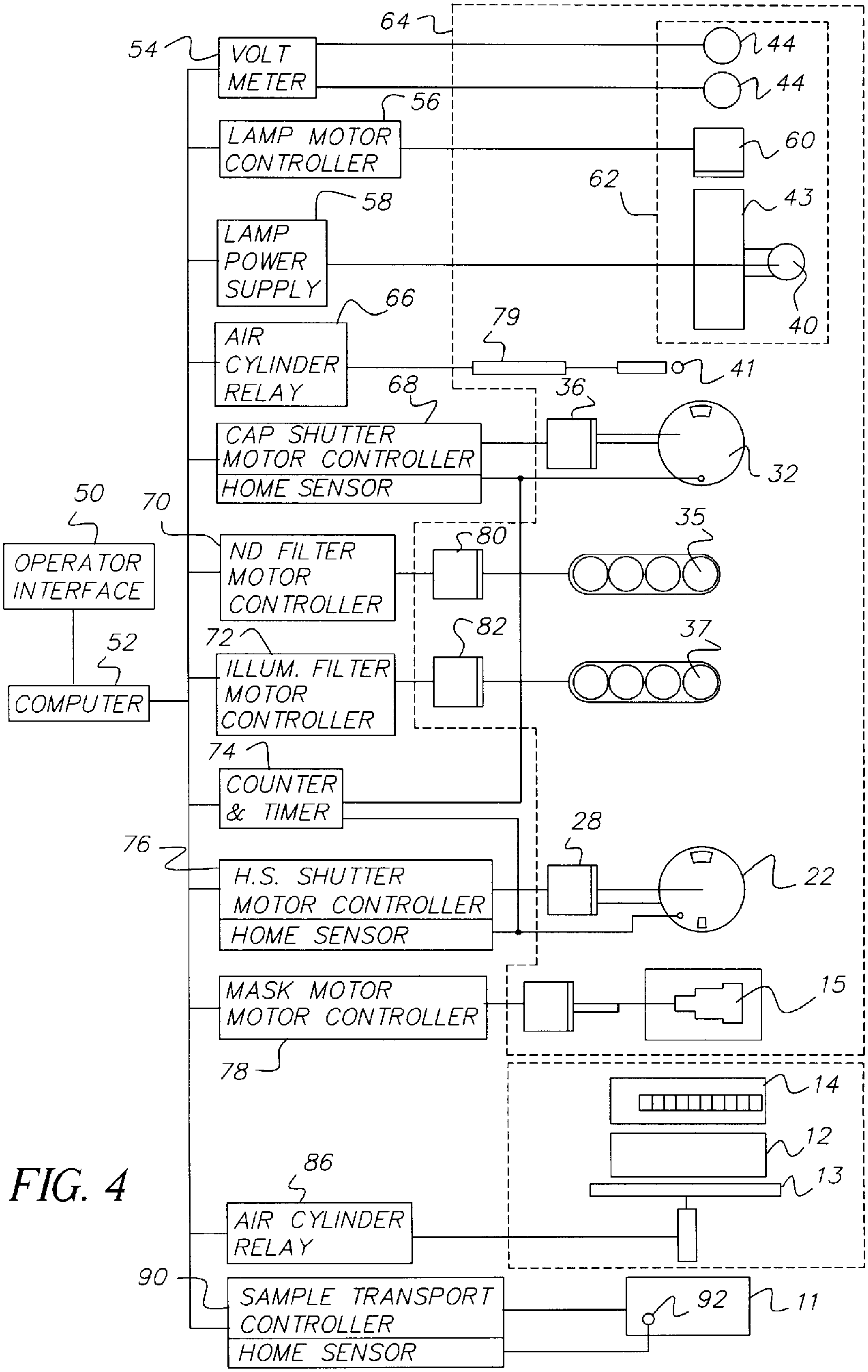
FIG. 4 is a block diagram of a sensitometer including the shuttering system of the present invention.

Turning to FIG. 4, there is shown a block diagram schematically depicting the control interface of the principal components of the sensitometer including the shuttering system of the present invention. An operator interface 50 to a computer 52 allows the operator to control operation of the sensitometer. The computer 52 is interfaced with a volt meter 54, a lamp motor controller 56, and a lamp power supply 58. Volt meter 54 is connected to red and blue detectors 44. Lamp motor controller 56 is connected to motor 60 which drive lamp positioning mechanism 43. Lamp power supply 58 is connected to lamp 40. Motor 60, lamp positioning mechanism 43, and red and blue detectors 44 all reside in a lamp enclosure 62 which are contained within sensitometer enclosure 64.

Computer 52 is also interfaced with air cylinder relay 66, cap shutter motor controller 68, neutral density filter motor controller 70, illuminate filter motor controller 72, counter and timer 74, high speed motor controller 76, and mask motor controller 78. Air cylinder relay 66 controls operation of pneumatic cylinder 79 which positions heat absorber 41. Cap shutter motor controller 68 controls operation of micro-step motor 36. Neutral density filter motor controller 70 and illuminate filter motor controller 72 are connected respectively to motors 80, 82 for positioning of neutral density filter 35 and illuminate filter 37. High speed motor controller 78 is connected to micro-step motor 28 which drives rotation of high speed shutter 22. Mask motor controller 78 is connected to motor 84 which drives the positioning of mask 15. The computer also receives signals from home sensors 30, 38.

In addition, computer 52 interfaces with air cylinder relay 86 which is connected to pneumatic cylinder 88 which positions press platen 13 to press sample 12 against test object 14. Finally, computer 52 interfaces with sample transport controller 90 which controls operation of a sample transport motor which is part of the sample transport hardware 11 and which includes a home sensor 92.

The shutter system 10 may be used in two ways. In one mode of operation any one of the three slits 16, 18, 20 is centered in the optical path 98 and the high speed shutter's large aperture 26 and the capping shutter's aperture 34 are positioned to allow light to fall onto the opaque portion of the test object 14. The sample transport 11 holding the test object 14 and sample 12 to be exposed is then accelerated to a constant velocity, causing the attenuating portion of the test object 14 and the sample 12 behind it to sweep past the illuminated exposure area. To produce the same exposure time for all test object steps the sample 12 must be at a constant velocity from the moment the first step reaches the exposure until the moment the last step leaves the exposure area. The resulting exposure is a product of the transport velocity and the size of the illuminated area imaged onto the sample 12 by the slit 16, 18, 20 (see Equation 1 below). The effective size of this illuminated area is affected by parallax and is a function of the relative positions of the sample 12 and slit 16, 18, 20 to the light source 40 (Equation 2). Equation 3 will calculate sample transport velocity $V_s$ needed to achieve the desired exposure time $T_e$.

$$T_e=W_i/V_s \qquad \text{Equation 1}$$

$$W_i=W_s*S_1/S_2 \qquad \text{Equation 2}$$

$$V_s=(W_s*S_1/S_2)/T_e \qquad \text{Equation 3}$$

Where:

$T_e$=Exposure time (seconds)

$V_s$=Sample transport velocity (inch per second)

$W_s$=Width of the exposing aperture in a direction parallel to the sample transport motion (inch)

$W_i$=Width if the light beam falling onto the sample caused by imaging the slit onto the sample (inch)

$S_1$=Distance from the sample to the lamp (inch)

$S_2$=Distance of the slit to the lamp (inch)

If we assume that the lamp 40 is sufficiently far from the sample 12 so that slit and parallax errors can be ignored (i.e. $S_1 \approx S_2$), the parameters presented in Table 1 will produce the listed exposure times as per Equation 3.

TABLE 1

| Exposure Time ($T_e$) | Slit size ($W_s$) | Sample Velocity ($V_s$) |
|---|---|---|
| 0.100 sec. | 0.400 inch | 4.000 inch/sec. |
| 0.040 sec. | 0.160 inch | 4.000 inch/sec. |
| 0.020 sec. | 0.160 inch | 8.000 inch/sec. |
| 0.010 sec. | 0.080 inch | 8.000 inch/sec. |

When beginning and ending an exposure sequence there will be a portion of the test object 14 that does not receive the proper amount of exposure due to the acceleration of the cap shutter 32 and sample transport 11. Therefore it is necessary that the test 14 be constructed with an opaque area on either side if the area to be exposed to prevent this light from reaching the sample 12.

After the sample 12 has been exposed the sample transport 11 needs to be stopped and returned to its starting position. Before the sample transport begins its return to the starting position the cap shutter 32 must rotate another half revolution to prevent light from reaching the exposure plane so that the sample 12 does not receive an additional exposure.

In making sensitometric exposures, exposure uniformity is of great concern. With the exposure technique described here the dimensional consistency of the width of each exposing slit 16, 18, 20 is the prime contributor to exposure uniformity since any imperfection or dimensional variation on the edge of the slit 16, 18, 20 will be imaged on the sample 12 and produce slight differences in exposure time. Therefore the technique for producing the slit 16, 18, 20 as well as the material used must be carefully selected. We have found that hardened spring steel using a laser milling technique works acceptably well.

However even this technique has limitations which limit how narrow a slit can be fabricated and still produce acceptable exposure uniformity. In addition, there are limits as to how fast the sample transport 11 can be moved. Therefore another shuttering technique is used to produce shorter exposure times. These exposures are made with the high speed shutter 22 spinning continuously at an appropriate speed and the cap shutter 32 spinning at a precise integer fraction of the high speed shutter speed to prevent multiple exposures from occurring. As with the slit type exposures explained above, sector shutter-type exposures will be made while the sample 12 is moving. The speeds of the sample transport 11 and the two sector shutters 22, 32 are chosen so that an exposure occurs precisely at the center of each step. Text book physics equations relating distance, time, velocity, and acceleration as shown in Equation 4 are used to calculate the needed motion parameters.

$$S=(\tfrac{1}{2}*A*T_a^2)+(V*T_v) \qquad \text{Equation 4}$$

Where:

S=Total distance traveled (inch or revolutions units)

A=Acceleration (inch/sec^2 or revolutions/sec^2 units)

V=Velocity (inch/sec or revolutions/sec units)

$T_a$=Time duration of movement at a constant acceleration (seconds units)

$T_v$=Time duration of movement at a constant velocity (seconds units)

The motions needed to expose properly with this dual rotating shutter system are as follows. First it is necessary to determine an optimum range of speeds for the sample transport 11. This sample transport speed then must to be factored with the step-to-step spacing of the test object 14 to determine the needed cap shutter velocity during the exposure cycle. This is shown in Equation 5.

$$\omega_c=V_s/S_{to} \qquad \text{Equation 5}$$

Where:

$\omega_c$=Capping Shutter velocity (revolutions per sec.)

$V_s$=Sample Transport (inch per sec)

$S_{to}$=Step-to-step spacing of the test object steps (inches)

For example, if we assume a sample transport velocity $V_s$ of 4 ips and a test object step spacing $S_{to}$ of 0.400" then Equation 5 can be used to determine the needed cap shutter velocity of 10 rps.

The high speed shutter 22 is designed with two exposing apertures 24, 26 of different size located 180° apart. The larger aperture 26 is used when making longer exposure times, while the smaller aperture 24 is used for shorter exposure times. The speed $\omega_h$ needed to spin the high speed shutter 22 to produce the needed exposure times is calculated as shown in Equation 6.

$$\omega_h=(E_a*S_1/S_3)/(360*T_e) \qquad \text{Equation 6}$$

Where:

$T_e$=Exposure time (seconds)

$\omega_h$=High Speed Shutter velocity (revolutions per sec.)

$E_a$=Exposure Aperture Size (degrees)

$S_3$=Distance from high speed shutter to the lamp (inch)

For example, if the size of the large aperture 26 is 14.4° and the smaller aperture 24 is 1.44°, Equation 6 can be used to calculate the needed High Speed shutter velocity $\omega_h$ for given exposure times. Note that is not necessary that the size of the two apertures 24, 26 differ by a factor of ten. If we assume that the lamp 40 is sufficiently far from the sample 12 so that parallax errors can be ignored (i.e. $S_h \approx S_l$), Equation 6 yields the parameters presented in Table 2.

TABLE 2

| Exposure Time ($T_e$) | Aperture size ($E_a$) | High Speed Shutter Velocity ($\omega_h$) |
|---|---|---|
| 0.004 sec. | 14.4° | 10 rps. |
| 0.002 sec. | 14.4° | 20 rps. |
| 0.001 sec. | 14.4° | 40 rps. |
| 0.0004 sec. | 1.44° | 10 rps. |
| 0.0002 sec. | 1.44° | 20 rps. |
| 0.0001 sec | 1.44° | 40 rps. |

Acceleration values for both the sample transport 11 and cap shutter 32 also need to be calculated so that their motions are synchronized with the high speed shutter 22 so that the first step on the test object 14 receives the correct exposure. There are several ways to arrive at these acceleration values but all depend on the acceleration capabilities of both the sample transport 11 and cap shutter 32. Calculations must also take into account the positions of the two apertures 24, 26 on the high speed shutter 22 when the home signal is generated as well as to the position of the cap shutter's aperture 34. The high speed shutter 22 generates its home signal when the large aperture 26 is centered in the optical path 98 and the small aperture 24 is 180 degrees away from the optical path 98. The high speed shutter's home sensor 30 is used to generate a signal that starts the exposure cycle. At the start of the exposure cycle the cap shutter 32 is stationary with its aperture 180 degrees away from the optical path 98. Therefore, to synchronize with the high speed shutter's large aperture 26 the cap shutter 32 must travel an integer plus ½ revolutions in the time it takes the high speed shutter 22 to travel an integer number of revolutions. To synchronize with the high speed shutter's small aperture 24, the cap shutter 32 must travel an integer plus ½ revolutions in the time it takes the high speed shutter to travel an integer plus ½ number of revolutions. The distance $S_c$ the cap shutter moves before synchronization occurs consists of distance moved when accelerating and under constant velocity, and is expressed in Equation 7. The time the cap shutter 32 takes to move this distance motions consists of three components: time $T_\alpha$ needed to accelerate, time $T_\omega$ spent traveling at a constant velocity $\omega_c$, and time $T_l$ lost due to processing the trigger signal, and must equal some selected multiple of high speed shutter 22 revolutions as explained above. This is expressed in Equations 8 and 9. The time $T_\alpha$ required to accelerate the cap shutter 32 is expressed in Equation 10. Equations 7, 8, 9, and 10 may then be combined to determine the needed cap shutter 32 acceleration $\alpha_c$ as shown in Equation 11.

$$S_c=(½*\omega_c*T_\alpha^2)+(\omega_c*T_\omega) \quad \text{Equation 7}$$

$$T_c=T_l+T_\alpha+T_\omega \quad \text{Equation 8}$$

$$T_c=N_h/\omega_h \quad \text{Equation 9}$$

$$T_\alpha=\omega_c/\alpha_c \quad \text{Equation 10}$$

$$\alpha_c=(½*\omega_c^2)/((N_h*\omega_c/\omega_h)-(\omega_c*T_l)-S_c) \quad \text{Equation 11}$$

Where:

$\omega_h$=High Speed Shutter velocity (revolutions per sec.)

$\omega_c$=Capping Shutter velocity (revolutions per sec.)

$\alpha_c$=Capping shutter acceleration (revolutions per sec per sec)

$S_c$=Total Cap shutter distance traveled before synchronization (integer+½ revolutions)

$T_\alpha$=Time needed to accelerate the cap shutter (seconds)

$T_\omega$=Amount of time the capping shutter is at constant velocity prior to being in phase with the high speed shutter (sec)

$T_l$=Time lost processing the trigger signal from the high speed shutter (sec)

$T_c$=Total cap shutter to high speed shutter synchronization time (seconds)

$N_h$=Desired number of high speed shutter revolutions before attaining synchronization with cap shutter (revolutions)

For example, if we assume as in the examples before that $\omega_c$=10 rps, that time $T_l$ lost to processing the trigger signal is 0.002 seconds, and that values for $N_h$ should be selected that keep cap shutter accelerations $\alpha_c$ under 100 rpss, then the following parameters will produce the exposure times set for the in Table 3.

TABLE 3

| $T_e$ (sec) | $\omega_c$ (ipss) | $\alpha_c$ (rps) | $\omega_h$ (rpss) | $E_a$ (rps) | $S_c$ (revs) | $N_h$ (revs) | $T_l$ (sec) | $T_c$ (sec) |
|---|---|---|---|---|---|---|---|---|
| .004 | 10.0 | 33.784 | 10.0 | 14.4 | 1.5 | 3 | 0.002 | 0.3000 |
| .002 | 10.0 | 51.020 | 20.0 | 14.4 | 1.5 | 5 | 0.002 | 0.2500 |
| .001 | 10.0 | 51.020 | 40.0 | 14.4 | 1.5 | 10 | 0.002 | 0.2500 |
| .0004 | 10.0 | 51.020 | 10.0 | 1.44 | 1.5 | 2.5 | 0.002 | 0.2500 |
| .0002 | 10.0 | 40.650 | 20.0 | 1.44 | 1.5 | 5.5 | 0.002 | 0.2750 |
| .0001 | 10.0 | 45.249 | 40.0 | 1.44 | 1.5 | 10.5 | 0.002 | 0.2625 |

Once the motions of the high speed shutter 22 and cap shutter 32 are calculated, it is possible to calculate the motion parameters of the sample transport 11 so that it positions the test object 14 and sample 12 properly for the exposures. When determining how to move the sample transport 11 it may be important to consider that perhaps sample transport acceleration should always be the same regardless of the exposure time being made so as not to startle the operator making the exposure. Therefore a reasonable $A_s$ value first needs to be selected. Then, since both acceleration $A_s$ and transport velocity $V_s$ (in Equation 5) are known, the time $T_a$ required to accelerate the transport 11 is known, as shown in Equation 12. To be synchronized, the sample transport 11 needs to move from it's home position to the 1$^{st}$ exposure position where the first step 96 is aligned in the optical path 98 in the same time it takes the cap shutter 32 to move into position $T_c$ plus some integer multiple of cap shutter revolutions. This is expressed in Equation 13. Note that this will allow the cap shutter 32 and high speed shutter 22 to synchronize before the sample transport 11 is in position, but this poses no problem since the unwanted exposures will be made on an opaque portion of the test object 14. The time $T_s$ required for the sample transport 11 to synchronize may also be expressed as the time needed to accelerate $T_a$ and move at constant velocity $T_v$ plus a delay time $T_d$, and is shown in Equation 14. Equation 15 uses Equation 4 to express the movement of the sample transport 11. Equations 12 through 15 may be combined to calculate the time $T_d$ required to delay sample transport movement to achieve synchronization and is shown in Equation 16.

$$T_a=V_s/A_s \quad \text{Equation 12}$$

$$T_s=N_c/\omega_c+T_c \quad \text{Equation 13}$$

$$T_s=T_a+T_v+T_d \quad \text{Equation 14}$$

$$D_l=½*A_s*T_a^2+V_s*T_v \quad \text{Equation 15}$$

$$T_d=N_c/\omega_c+T_c-D_l/V_s-\tfrac{1}{2}*V_s/A_s \qquad \text{Equation 16}$$

Where:

$T_s$=Total sample transport to cap shutter synchronization time (seconds)

$T_d$=Delay time from when the sample transport receives the trigger signal and when it begins to accelerate (seconds)

$D_l$=Distance from sample transport home position to $1^{st}$ exposure step (inch)

$V_s$=Sample Transport (inch per sec)

$A_s$=Sample transport acceleration (inch per sec per sec)

$N_c$=Desired number of cap shutter revolutions after it has synchronized with the high speed shutter before attaining synchronization with sample transport (integer)

For example, if we assume as in the examples before that $\omega_c$=10 rps, that time $T_l$ lost to processing the trigger signal is 0.002 seconds, that values for $N_h$ should be selected that keep cap shutter accelerations $\alpha_c$ under 100 rpss, and that sample transport acceleration $A_s$=8 ipss and velocity $V_s$=4 ips, and that the sample transport needs to move 1.200" for the $1^{st}$ exposure, then the parameters presented in Table 4 will synchronize the transport with the shutter system.

TABLE 4

| $T_e$ (sec) | $V_s$ (ips) | $A_s$ (ipss) | $\omega_c$ (ipss) | $\omega_h$ (rpss) | $E_a$ (rps) | $N_h$ (revs) | $D_1$ (inch) | $T_c$ (sec) | $T_d$ (sec) | $N_c$ |
|---|---|---|---|---|---|---|---|---|---|---|
| .004 | 4.00 | 8.00 | 10.0 | 10.0 | 14.4 | 3 | 1.200 | 0.0333 | 0.1500 | 4 |
| .002 | 4.00 | 8.00 | 10.0 | 20.0 | 14.4 | 5 | 1.200 | 0.2500 | 0.1000 | 4 |
| .001 | 4.00 | 8.00 | 10.0 | 40.0 | 14.4 | 10 | 1.200 | 0.2500 | 0.1000 | 4 |
| .0004 | 4.00 | 8.00 | 10.0 | 10.0 | 1.44 | 2.5 | 1.200 | 0.2500 | 0.1000 | 4 |
| .0002 | 4.00 | 8.00 | 10.0 | 20.0 | 1.44 | 5.5 | 1.200 | 0.2750 | 0.1250 | 4 |
| .0001 | 4.00 | 8.00 | 10.0 | 40.0 | 1.44 | 10.5 | 1.200 | 0.2625 | 0.1125 | 4 |

It should be noted that the since the sample transport 11 is in motion during the exposure sequence, a portion of each step will not receive the correct exposure. This distance $S_m$ is a product of the sample transport speed $V_s$ and the exposure time $T_e$ as shown in Equation 17, and is quite small relative to the overall step size $S_{to}$ (see Table 5).

$$S_m=V_s*T_e \qquad \text{Equation 17}$$

Where:

$S_m$=Portion along each edge of the exposed step that receives an incorrect exposure (inch)

TABLE 5

| $V_s$ (ips) | $T_e$ (sec) | $S_m$ (inch) |
|---|---|---|
| 4"/sec. | 0.004 sec. | 0.016" |
| 4"/sec. | 0.002 sec. | 0.008" |
| 4"/sec. | 0.001 Sec. | 0.004" |
| 4"/sec. | 0.0004 sec. | 0.0016" |
| 4"/sec. | 0.0002 sec. | 0.0008" |
| 4"/sec. | 0.0001 sec. | 0.0004" |

The size of cap shutter aperture 34 is critical for efficient shuttering. It should be big enough to allow the most amount of miss-positioning caused by synchronization error between the cap shutter 32 and the high speed shutter 22, and at the same time small enough to prevent multiple exposures even when the high speed shutter 22 and cap shutter 32 are not synchronized precisely. Since the high speed shutter 22 has two apertures 24, 26, the cap shutter 32 must be completely out of the exposure area in the time it takes the high speed shutter 22 to turn 180°. The worst case is the situation where the cap shutter 32 is spinning slower than the high speed shutter 22. In the examples shown above where the high speed shutter 22 can be spinning 4× faster than the cap shutter 32, the cap shutter aperture 34 needs to be completely out of the optical path 98 in $\tfrac{1}{8}^{th}$ revolution, or a 45° arc. Therefore, the cap shutter aperture $C_a$ needs to be no greater than 45° wide. See equation 18. In the shutter system described here a $C_a$ value of 40° was chosen.

$$C_a<=360°*\omega_c/(2*\omega_h) \qquad \text{Equation 18}$$

Where:

$C_a$=Cap shutter aperture size (degrees)

Misalignment of the exposing aperture 24, 26 and cap shutter 32 will cause incorrect exposures, so it is important to calculate how precisely the cap shutter 32 and high speed shutter 22 need to be synchronized. This calculation is very much dependent on the physical layout of the optical system as well as the sizes of the exposing aperture 24, 26 ($E_a$) and cap shutter aperture 34 ($S_a$). In general, however, an exposure can be considered incorrect if the cap shutter aperture 34 has not opened sufficiently to completely illuminate the exposure plane at the moment the high speed shutter exposing aperture 24, 26 enters the optical path 98. Using this assumption the maximum tolerable synchronization error can be calculated as shown in Equation 19. Allowable cap shutter synchronization errors using the assumptions made above with a cap shutter aperture $C_a$ of 40° are set forth in Table 6:

TABLE 6

| $T_e$ | $C_a$ (deg) | $E_a$ (deg) | $\omega_c$ (rps) | $\omega_h$ (rps) | M (sec) |
|---|---|---|---|---|---|
| 0.004sec. | 400 | 14.4° | 10 rps | 10 rps | 0.0036 sec |
| 0.002sec. | 40° | 14.4° | 10 rps | 20 rps | 0.0046 sec |
| 0.001sec. | 40° | 14.4° | 10 rps | 40 rps | 0.0050 sec |
| 0.0001sec. | 40° | 1.44° | 10 rps | 10 rps | 0.0054 sec |
| 0.0001sec. | 40° | 1.44° | 10 rps | 20 rps | 0.0055 sec |
| 0.0001sec. | 40° | 1.44° | 10 rps | 40 rps | 0.0055 sec |

$$X=\tfrac{1}{2}*((C_a/\omega_c)-(E_a/\omega_h))/360° \qquad \text{Equation 19}$$

Where:

X=Acceptable deviation of the cap shutter aperture and high speed shutter exposing aperture (seconds)

The cap shutter synchronization error can be measured while the exposures are being made by measuring the difference between the home signals of the cap shutter 32 to the home signal of the high speed shutter 22. The expected time difference P between the cap shutter and high speed shutter home sensor signals during an exposure is calculated in Equation 20. The exposure is acceptable if Equation 21 is satisfied.

$$P=T_c-N_h/\omega_h \qquad \text{Equation 20}$$

$$X<\mathrm{ABS}(M-P) \qquad \text{Equation 21}$$

Where:

P=Expected time difference between the cap shutter and high speed shutter home sensor signals during an exposure (seconds)

M=Actual measured time difference between the cap shutter and high speed shutter home sensor signals during an exposure (seconds)

In the operation of the shuttering system 10 of the present invention to make slit-type exposures, the operating sequence is as follows:

First, the exposure mechanisms are set. Capping shutter 32 and high speed shutter 22 are both closed. Sample transport 11 is moved to the home position. Filters 35, 37, 39 are positioned. Lamp 40 is positioned. Mask 15 is positioned. Press platen 13 is opened. With the exposure mechanisms set, the movement parameters for the sample transport 22 are calculated and downloaded. Transport 11 is programmed to move a specified distance after receiving an exposure trigger signal. Velocity of the transport 11 is based on a precalibrated value (based on slit 16, 18, 20 size and some nominal position of lamp 40) and factored with the present position of the lamp 40. The actual distance moved by the transport 11 is always the same and is based on the size of the test object 14. The acceleration parameter can be predetermined. The parameters for the movement of capping shutter 32 can then be calculated and downloaded. After receiving the exposure trigger signal, capping shutter 32 will move ½ revolution to open, execute a time delay, and move ½ revolution to close at the same moment the sample transport 11 begins to move. The velocity parameter of the capping shutter 32 is predetermined (e.g. 10 rps). The acceleration parameter for the capping shutter 32 is also predetermined (e.g. 200 rpss). The time to hold capping shutter 32 open is determined by the velocity of the sample transport 11 and the size of the test object 14. At this point, the sensitometer is ready to receive an exposure request from the operator. Press platen 13 is closed. High speed shutter 22 is rotated to align aperture 26 in optical path 98. Once high speed shutter 22 is in position the computer sends an exposure enable signal to the exposure trigger circuit which transmits an exposure trigger signal to sample transport 11 and capping shutter 32 thereby beginning their motion sequence. The exposure sequence defined above is then completed. At the completion of the exposure sequence, the exposure mechanisms are reset. In particular, the high speed shutter 22 is closed, sample transport 11 is moved to the home position, and press platen 13 is opened allowing sample 12 to be removed.

In the operation of the shuttering system 10 of the present invention for high speed exposures, the operating sequence is as follows:

First, the exposure mechanisms are set. Capping shutter 32 is closed. Sample transport 11 is moved to the home position. Filters 35, 37, 39 are positioned. Lamp 40 is positioned. Mask 15 is positioned. Press platen 13 is opened. The movement parameters of the high speed shutter 22 are calculated and downloaded. The velocity parameter for high speed shutter 22 is calculated from a pre-calibrated value for the size of the slit 16, 18, 20 selected, and factored with the position of lamp 40 to correct for parallax errors. The acceleration parameter for high speed shutter 22 is calculated so that high speed shutter 22 reaches target velocity when the exposing aperture 24, 26 is exactly in the exposure path for the desired amount of time. High speed shutter 22 is programmed for continuous movement and rotation of high speed shutter 22 is started. The parameters for the movement of capping shutter 32 can then be calculated and downloaded. After receiving a trigger signal, capping shutter 32 will always make one revolution for the desired number of exposures plus one revolution to fully open and close. Velocity of capping shutter 32 will always be an integer multiple of high speed shutter 22, depending on the size of the particular slit 16, 18, 20 used. The acceleration parameter for the capping shutter 32 is calculated to cause capping shutter velocity to reach target velocity the moment the selected aperture 24, 26 of high speed shutter 22 is in its exposure position aligned with optical path 98. Movement parameters for the sample transport 22 are calculated and downloaded. Transport 11 is programmed to move a specified distance after receiving a trigger signal. Velocity of the transport 11 will always be a constant multiple of the velocity of capping shutter 32 based on the size of the test object steps. The actual distance moved by the transport 11 is always the same and is based on the length of the test object 14. The acceleration parameter may be predetermined. A time delay parameter is calculated based on when the shutter system 10 makes its first exposure, as well as the velocity and acceleration parameters of sample transport 11. At this point, the sensitometer is ready to receive an exposure request from the operator. Press platen 13 is closed. The computer sends an exposure enable signal to the exposure trigger circuit. The exposure trigger signal is transmitted to capping shutter 32 and sample transport 11 when high speed shutter 22 next reaches its home position and generates a home signal. Upon receiving the exposure trigger signal, sample transport 11 and capping shutter 32 begin their respective motion sequences. As each test object step is aligned in optical path 98, capping shutter aperture 34 and the selected exposing aperture 24, 26 of high speed shutter 22 are also aligned in optical path 98. The exposure time is determined by the speed of high speed shutter 22. The exposure sequence is then completed. At the completion of the exposure sequence, wait for movement sample transport 11 and cap shutter 32 to stop. The exposure mechanisms may then be reset. In particular, sample transport 11 is moved to the home position, and press platen 13 is opened allowing sample 12 to be removed.

EXAMPLES

Figure 5:
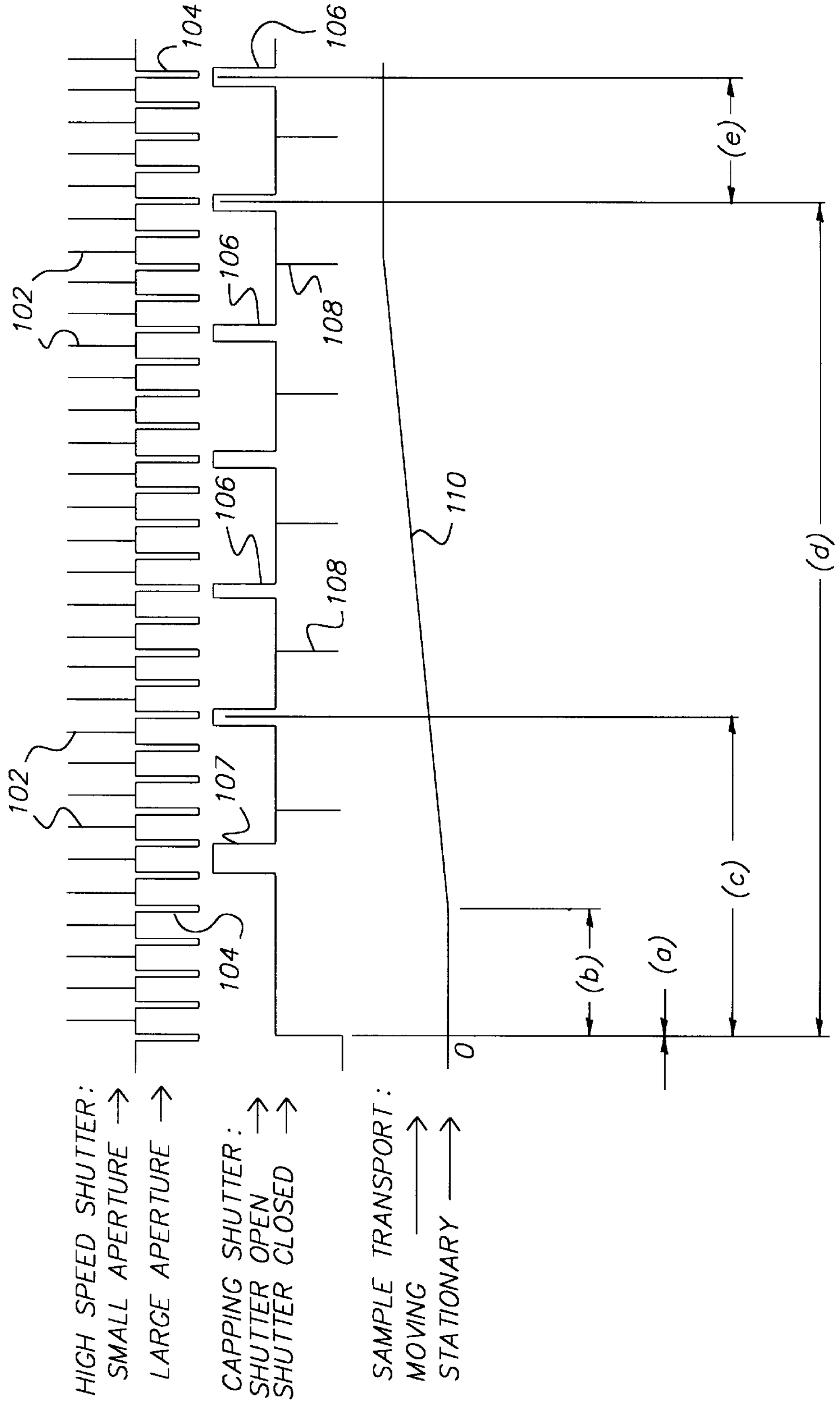
FIG. 5 shows an operating time line for a first example using the shuttering system of the present invention.
Figure 6:
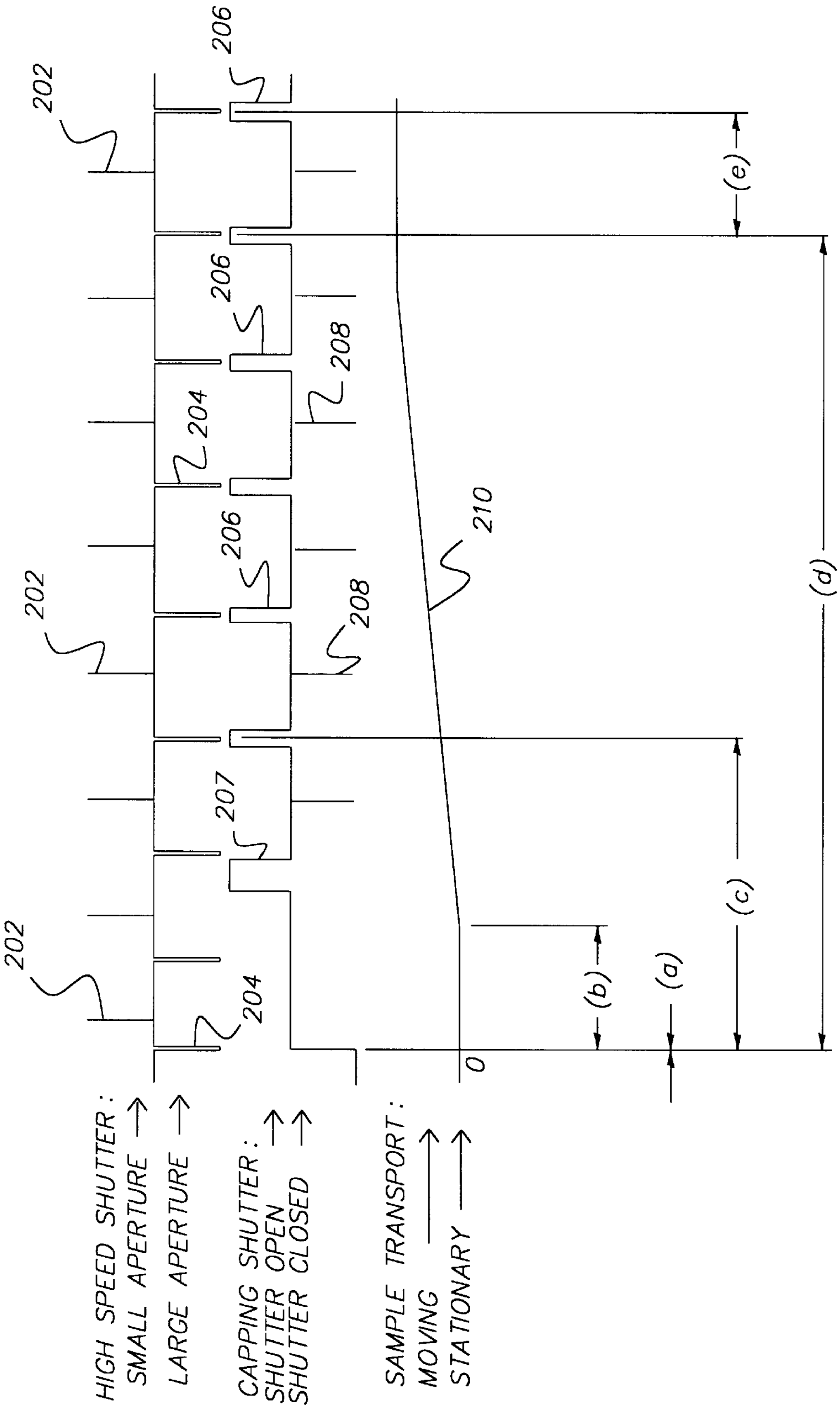
FIG. 6 shows an operating time line for a second example using the shuttering system of the present invention.
Figure 7:
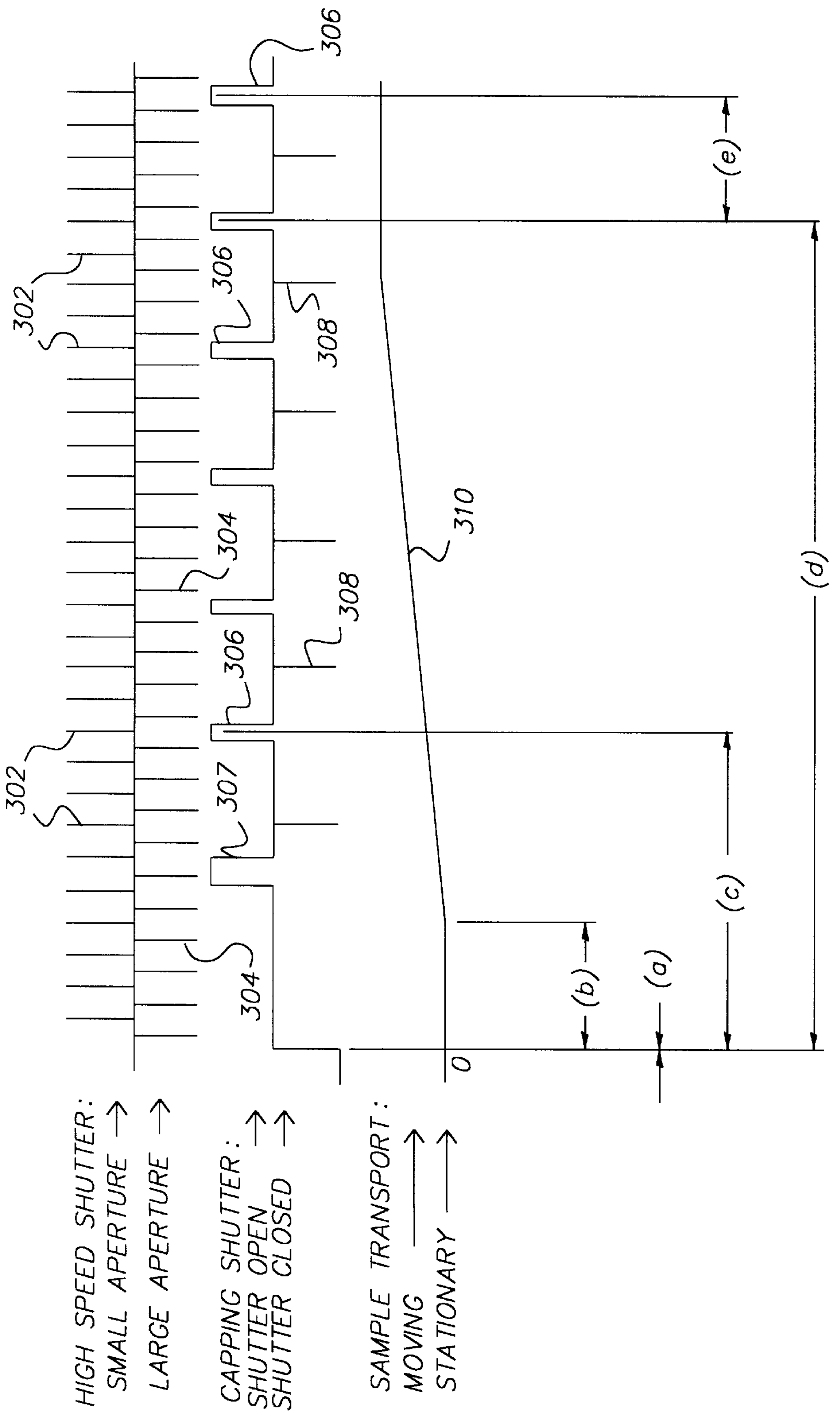
FIG. 7 shows an operating time line for a third example using the shuttering system of the present invention.

FIGS. 5 through 7 depict three operating exposure examples using the shuttering system 10 of the present invention in the high speed operating mode. FIG. 5 depicts an operating time line for the shuttering system 10 with a first exemplary exposure time of 0.001 seconds. The operating parameter assumptions for this example are as follows. There is a 0.400" spacing (center-to-center) from step to step on the test object 14. The first exposure is made at a distance of 1.2" onto the sample 12. Small aperture 24 has an arc length of 1.44° and large aperture 26 has an arc length of 14.4°. Aperture 34 of cap shutter 32 has an arc length of 40°. Trigger delay time (a) for the hardware is 0.002 sec. Sample transport velocity equals 4.000 inch/sec. Sample transport acceleration equals 8.000 inch/sec./sec. Therefore, from the equations given above the following determinations can be made. High speed shutter velocity is 40 rps (0.025 sec. frequency). Cap shutter velocity is 10 rps. Cap shutter acceleration equals 51.020 rpss. Sample transport delay (b) is 0.100 sec. Peaks 102 represent each occurrence of aperture 24 aligning with the optical path 98. Peaks 104 represent each occurrence of aperture 26 aligning with the optical path 98. Peaks 106 and 107 show when aperture 34 is open (aligned in optical path 98). Peak 107 is depicted as wider than peaks 106 because the capping shutter 32 has not yet accelerated to target speed. Peaks 108 show when aperture 34 is closed (180° out of alignment with optical path 98). Line 110 plots the velocity of sample transport 11 over time (note that velocity is constant by the time the first exposure on the sample is made). High speed shutter 22 and capping shutter 32 synchronize in a time interval (c) of 0.250 sec. The first exposure in the sample is made at an interval (d) 0.700 sec. (1.200" on the sample). The second and subsequent exposures are made at 0.100 sec. intervals (e) (every 0.400" on the sample).

FIG. 6 depicts an operating time line for the shuttering system 10 with a first exemplary exposure time of 0.001 seconds. The operating parameter assumptions for this example are as follows. There is a 0.400" spacing (center-to-center) from step to step on the test object 14. The first exposure is made at a distance of 1.2" onto the sample 12. Small aperture 24 has an arc length of 1.44° and large aperture 26 has an arc length of 14.4°. Aperture 34 of cap shutter 32 has an arc length of 40°. Trigger delay time (a) for the hardware is 0.002 sec. Sample transport velocity equals 4.000 inch/sec. Sample transport acceleration equals 8.000 inch/sec./sec. Therefore, from the equations given above the following determinations can be made. High speed shutter velocity is 10 rps (0.100 sec. frequency). Cap shutter velocity is 10 rps. Cap shutter acceleration equals 33.784 rpss. Sample transport delay (b) is 0.150 sec. Peaks 202 represent each occurrence of aperture 24 aligning with the optical path 98. Peaks 204 represent each occurrence of aperture 26 aligning with the optical path 98. Peaks 206 and 207 show when aperture 34 is open (aligned in optical path 98). Peaks 207 is depicted as wider than peaks 206 because the capping shutter 32 has not yet accelerated to target speed. Peaks 208 show when aperture 34 is closed (180° out of alignment with optical path 98). Line 210 plots the velocity of sample transport 11 over time (note that velocity is constant by the time the first exposure on the sample is made). High speed shutter 22 and capping shutter 32 synchronize in a time interval (c) of 0.300 sec. The first exposure in the sample is made at an interval (d) 0.700 sec. (1.200" on the sample). The second and subsequent exposures are made at 0.100 sec. intervals (e) (every 0.400" on the sample).

FIG. 7 depicts an operating time line for the shuttering system 10 with a first exemplary exposure time of 0.0001 seconds. The operating parameter assumptions for this example are as follows. There is a 0.400" spacing (center-to-center) from step to step on the test object 14. The first exposure is made at a distance of 1.2" onto the sample 12. Small aperture 24 has an arc length of 1.44° and large aperture 26 has an arc length of 14.4°. Aperture 34 of cap shutter 32 has an arc length of 40°. Trigger delay time (a) for the hardware is 0.002 sec. Sample transport velocity equals 4.000 inch/sec. Sample transport acceleration equals 8.000 inch/sec./sec. Therefore, from the equations given above the following determinations can be made. High speed shutter velocity is 40 rps (0.025 sec. frequency). Cap shutter velocity is 10 rps. Cap shutter acceleration equals 45.249 rpss. Sample transport delay (b) is 0.1125 sec. Peaks 302 represent each occurrence of aperture 24 aligning with the optical path 98. Peaks 304 represent each occurrence of aperture 26 aligning with the optical path 98. Peaks 306 and 307 show when aperture 34 is open (aligned in optical path 98). Peak 307 is depicted as wider than peaks 306 because the capping shutter 32 has not yet accelerated to target speed. Peaks 308 show when aperture 34 is closed (180° out of alignment with optical path 98). Line 310 plots the velocity of sample transport 11 over time (note that velocity is constant by the time the first exposure on the sample is made). High speed shutter 22 and capping shutter 32 synchronize in a time interval (c) of 0.250 sec. The first exposure in the sample is made at an interval (d) 0.6625 sec. (1.200" on the sample). The second and subsequent exposures are made at 0.100 sec. intervals (e) (every 0.400" on the sample).

Although the preferred embodiment of the present invention has been described herein as having two apertures 24, 26 in high speed shutter 22, those skilled in the art will understand that the shuttering system 10 can also be practiced with a single aperture or with more than two apertures in high speed shutter 22. Further, those skilled in the art will recognize that although mask 15 is shown with three slits therein, the shuttering system 10 can also be practiced with one or more slits in mask 15.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not a limiting sense.

What is claimed is:

1. A sensitometer comprising:

(a) means for movably supporting a sample of radiation sensitive material in an exposure plane so as to precisely position said sample to receive gradated exposures;

(b) a source of radiant energy for delivering radiant energy along a light path;

(c) a mask located adjacent said exposure plane, said mask having at least one slit therein, (d) a high speed rotating shutter having at least one high speed aperture therein, said at least one high speed aperture aligning once with said light path for each rotation of said high speed rotating shutter, said high speed rotating shutter being positioned between said mask and said source of radiant energy; and (e) a rotatable capping shutter disk having a cap shutter aperture therein, said rotatable capping shutter disk located between said high speed rotating shutter and said source of radiant energy, said cap shutter aperture aligning once with said light path for each rotation of said rotatable capping shutter disk.

2. A sensitometer as recited in claim 1 further comprising:

means for controlling when said at least one high speed aperture and said cap shutter aperture simultaneously align with said light path.

3. A sensitometer as recited in claim 1 wherein:

there are at least two slits in said mask, each of said at least two slits having a different width, said mask being movable to align any of said at least two slits with said light path.

4. A sensitometer as recited in claim 1 wherein:

there are at least two high speed apertures in high speed rotating shutter, each of said at least two high speed apertures having a different arc length.

5. A sensitometer as recited in claim 4 further comprising:

means for controlling when said said cap shutter aperture and a selected one of said at least two high speed apertures simultaneously align with said light path.

6. A sensitometer as recited in claim 4 further comprising:

a lamp positioning mechanism.

7. A sensitometer comprising:

(a) means for movably supporting a sample of radiation sensitive material in an exposure plane so as to precisely position said sample to receive gradated exposures;

(b) a source of radiant energy for delivering radiant energy along a light path;

(c) a mask located adjacent said exposure plane, said mask having at least one slit therein, (d) a high speed rotating shutter having a first high speed aperture and a second high speed aperture therein, each of said first and second high speed apertures having a different arc length from the other, said first and second high speed apertures being spaced 180° from each other, each of said first and second high speed apertures aligning once with said light path for each rotation of said high speed rotating shutter, said high speed rotating shutter being positioned between said mask and said source of radiant energy; and (e) a rotatable capping shutter disk having a cap shutter aperture therein, said rotatable capping shutter disk located between said high speed rotating shutter and said source of radiant energy, said cap shutter aperture aligning once with said light path for each rotation of said rotatable capping shutter disk.

8. A sensitometer as recited in claim 7 further comprising:

means for controlling when said cap shutter aperture and a selected one of said first and second high speed aperture simultaneously align with said light path.

9. A sensitometer comprising:

(a) means for movably supporting a sample of radiation sensitive material in an exposure plane so as to precisely position said sample to receive gradated exposures;

(b) a source of radiant energy for delivering radiant energy along a light path;

(c) a mask located adjacent said exposure plane, said mask having at least one slit therein, (d) a high speed rotating shutter having at least two high speed apertures therein, each of said at least two high speed apertures having a different arc length from the other, each of said at least two high speed apertures aligning once with said light path for each rotation of said high speed rotating shutter, said high speed rotating shutter being positioned between said mask and said source of radiant energy; and (e) a rotatable capping shutter disk having a cap shutter aperture therein, said rotatable capping shutter disk located between said high speed rotating shutter and said source of radiant energy, said cap shutter aperture aligning once with said light path for each rotation of said rotatable capping shutter disk.

10. A sensitometer as recited in claim 9 further comprising:

means for controlling when said cap shutter aperture and a selected one of said at least two high speed apertures simultaneously align with said light path.

11. A method for sensitometrically exposing samples comprising the steps of:

(a) positioning a mask having at least one slit therein such that the slit aligns with an optical path;

(b) rotating a high speed shutter having at least one exposing aperture therein to a predetermined velocity;

(c) accelerating a rotatable capping shutter having a cap shutter aperture therein to a velocity synchronized to a multiple of the predetermined velocity such that the cap shutter aperture and a selected one of the at least one exposing aperture align in said optical path at predetermined intervals;

(d) emitting radiant energy along the optical path; and (e) moving a sample at a predetermined speed across said optical path.

12. A method as recited in claim 11 further comprising the step of:

determining the position of the at least one exposing aperture at a moment during each revolution of said high speed shutter.

13. A method as recited in claim 12 further comprising the step of:

sensing when the cap shutter aperture is in the optical path and when the cap shutter aperture is 180° out of the optical path.

* * * * *